(12) United States Patent
Cronin

(10) Patent No.: US 12,588,697 B1
(45) Date of Patent: Mar. 31, 2026

(54) METHOD OF COOKING WITH CANNABINOID INFUSED RECIPE

(71) Applicant: Chris Cronin, Wichita, KS (US)

(72) Inventor: Chris Cronin, Wichita, KS (US)

( * ) Notice: Subject to any disclaimer, the term of this patent is extended or adjusted under 35 U.S.C. 154(b) by 125 days.

(21) Appl. No.: 17/737,796

(22) Filed: May 5, 2022

Related U.S. Application Data

(60) Provisional application No. 63/190,059, filed on May 18, 2021.

(51) Int. Cl.
| | |
|---|---|
| *A61K 31/352* | (2006.01) |
| *A23L 5/10* | (2016.01) |
| *A23L 27/14* | (2016.01) |
| *A23L 29/00* | (2016.01) |
| *A23L 29/30* | (2016.01) |

(52) U.S. Cl.
CPC .................. *A23L 29/03* (2016.08); *A23L 5/19* (2016.08); *A23L 27/14* (2016.08); *A23L 29/30* (2016.08)

(58) Field of Classification Search
CPC . A23L 29/03; A23L 5/19; A23L 27/14; A23L 29/30
USPC ........................................................ 426/534
See application file for complete search history.

(56) References Cited

U.S. PATENT DOCUMENTS

| | | |
|---|---|---|
| 9,526,792 B1 | 12/2016 | Degeeter |
| 10,028,987 B1 | 7/2018 | Pillsbury |
| 2016/0030387 A1 | 2/2016 | Winnicki |
| 2016/0143972 A1 | 5/2016 | Stebbins et al. |
| 2016/0193266 A1 | 7/2016 | Ablett |
| 2016/0199299 A1 | 7/2016 | Uren |
| 2018/0125088 A1 | 5/2018 | Jamroz |
| 2018/0236017 A1 | 8/2018 | Stoops |
| 2019/0116808 A1 | 4/2019 | Tedeschi et al. |
| 2020/0261406 A1* | 8/2020 | Muscarella ............. A61P 43/00 |

FOREIGN PATENT DOCUMENTS

| | | |
|---|---|---|
| AU | 2015274698 | 12/2016 |
| CA | 3023569 | 5/2019 |
| CN | 104026204 | 9/2016 |
| WO | WO2019157592 | 8/2019 |

\* cited by examiner

*Primary Examiner* — Brent T O'Hern
(74) *Attorney, Agent, or Firm* — John Rizvi; John Rizvi, P.A.—The Patent Professor ®

(57) ABSTRACT
A method for cooking savory food with a cannabinoid containing mixture. The method comprising the general steps of making a cannabinoid containing mixture and mixing the cannabinoid containing mixture with a savory food item, such as a brisket. In one exemplary embodiment, the cannabinoid containing mixture comprises brown sugar, garlic powder, onion powder, salt, black pepper, cajun seasoning, peppercorn pepper, white sugar, and a therapeutic amount of CBD or THC. If desired, a spicey component, such as habanero peppers, may be added to the cannabinoid containing mixture to add heat.

20 Claims, No Drawings

METHOD OF COOKING WITH CANNABINOID INFUSED RECIPE

CROSS-REFERENCE TO RELATED APPLICATIONS

This application claims the benefit of U.S. Provisional Patent Application Ser. No. 63/190,059, filed on May 18, 2021, which is incorporated herein in its entirety.

FIELD OF THE INVENTION

The present invention generally relates to recipes and cooking methods, and more particularly, to a recipe that includes a therapeutic amount of cannabidiol (CBD) and tetrahydrocannabinol (THC) and a method of using the recipe for cooking savory foods, such as meat.

BACKGROUND OF THE INVENTION

Herbalism has an extensive history, with some sources revealing written evidence of its practice dating back to 3,000 BC by Sumerians, and others demonstrating archeological evidence supporting a theory that it has been practiced for over 24,000 years. The medicinal qualities of plants range extensively, from treatment of indigestion, pain, and high fever to anxiety and poor blood circulation. In fact, many drugs prescribed by physicians or found over the counter are derived from plants, including aspirin, caffeine, and morphine. One particular plant genus, *Cannabis*, is popular for its derived components and their medicinal value.

There are different subspecies within the *Cannabis* genus, but they are often treated as a single species under the name *C. sativa*. According to the British Medical Journal, products extracted from cannabis plants for the purpose of medicinal use contain cannabinoids, such as tetrahydrocannabinol (THC) and cannabidiol (CBD). These cannabinoids are often prescribed to patients seeking to reduce their anxiety, alleviate chronic pain, stimulate appetite, and may be effective as a treatment option for those suffering from multiple sclerosis or nerve pain induced by HIV or other conditions.

In order for these cannabinoids to be properly utilized as treatment options, they must first be extracted from the cannabis plant. The plant produces trichomes, which are small bulbous glands found on its upper leaves and buds that serve to protect the plant from herbivores. These trichomes are where the cannabinoids are located at a high concentration. Therefore, to extract the cannabinoids in the purest form, the separation of the trichomes from the rest of the plant must be completed.

There are four main methods of absorbing the medicinal compounds found in cannabinoids: inhalation, oral, sublingual, and topical. While inhalation is the preferred method for products containing mostly THC due to its near immediate effect, oral ingestion allows the medicinal qualities to be consumed creatively.

A downside to edibles is that most are consumed exclusively. For example, popular items include brownies, gummies, beverages, and even popcorn: however, they are often eaten by themselves. This limits the diversity of the cannabinoid-containing foods. An alternative would encompass a cannabis-infused edible that is not only enjoyed by itself, but also with an array of other meals that may or may not contain cannabinoids. This would extend the potential of edibles into the greater culinary market.

Therefore, there is an unmet need for an edible that is not standalone, but instead can be added to other meals as a flavor enhancer and simultaneously provide the consumer with the medicinal benefits inherent in THC and CBD.

SUMMARY OF THE INVENTION

The present invention is directed to a recipe that includes a therapeutic amount of cannabidiol (CBD) and tetrahydrocannabinol (THC) and a method for cooking savory foods, such as meat and vegetables, with the recipe. Introducing a first embodiment of the invention, the present invention consists of a method of cooking savory foods with cannabinoids, comprising the steps of: providing a cannabinoid cooking mixture; and applying the cannabinoid containing mixture to a food item.

In another aspect, the food item comprises a meat element such as beef, chicken, or fish.

In another aspect, the cannabinoid cooking mixture comprises brown sugar, garlic powder, onion powder, salt, black pepper, cajun seasoning, peppercorn pepper, white sugar, and a therapeutic amount of CBD or THC.

In another aspect, the method further comprises rubbing the cannabinoid cooking mixture to the food item.

In yet another aspect, the method further comprises mixing the cannabinoid-cooking mixture with a liquid and injecting the formed liquid mixture into the food item.

In another aspect, the cannabinoid cooking mixture essentially comprises of about two cups of brown sugar, about one-half cup of garlic powder, about one-half cup of onion powder, about one-quarter cup of salt, about one-third cup of black pepper, about one-third cup of cajun seasoning, about one-quarter cup of peppercorn pepper, about one cup of white sugar, and about twenty-five milligrams of CBD or eighty milligrams of CBD and THC.

In yet another aspect, the cannabinoid cooking mixture may comprise grain alcohol, concentrate, white sugar, brown sugar, garlic powder, onion powder, sea salt, black pepper, cajun seasoning, smoked paprika, and a therapeutic amount of CBD or THC.

In another aspect, the cannabinoid cooking mixture may further comprise heat components such as habanero peppers.

In another aspect, the cannabinoid cooking mixture may comprise essentially of about a hundred and eighty-seven milligrams of grain alcohol, about one thousand milligrams of concentrate, about one cup of white sugar, about two cups of brown sugar, about one-half cup garlic powder, about one-half cup of onion powder, about one-quarter cup of sea salt, about one third cup of black pepper, about one third cup of cajun seasoning, about one ounce of smoked paprika, and varying therapeutic amounts of THC and CBD that may include between twenty five milligrams and about one-hundred milligrams of CBD and THC or two-hundred milligrams of THC.

In another embodiment, the present invention may include a method of cooking savory foods with cannabinoids, comprising the steps of:

providing a cannabinoid cooking mixture having a therapeutic amount of CBD or THC;

mixing the cannabinoid cooking mixture with concentrate to form a cannabinoid cooking solution;

mixing the cannabinoid cooking solution with alcohol to form an alcohol-based cannabinoid cooking solution;

adding the alcohol-based cannabinoid cooking solution to a meat item.

In yet another embodiment, the present invention may include a method of cooking savory foods with cannabinoids, comprising the steps of:

providing a cannabinoid cooking mixture having a therapeutic amount of CBD or THC;

mixing the cannabinoid cooking mixture with concentrate to form a cannabinoid cooking solution;

mixing the cannabinoid cooking solution with alcohol to form an alcohol-based cannabinoid cooking solution;

double boiling the alcohol-based cannabinoid cooking solution until the alcohol-based cannabinoid cooking solution reaches a desired color;

cooling the alcohol-based cannabinoid cooking solution to form a gell-like substance;

spreading the gell-like substance onto a flat sheet pan and allowed to dry;

mixing the dried gell-like substance with spices; and rubbing the gell-like substance to a meat item.

These and other objects, features, and advantages of the present invention will become more readily apparent from the attached drawings and the detailed description of the preferred embodiments, which follow.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terminology used herein is for the purpose of describing particular embodiments only and is not intended to be limiting of the invention. As used herein, the indefinite articles "a", "an" and "the" should be understood to include plural reference unless the context clearly indicates otherwise.

The phrase "and/or," as used herein, should be understood to mean "either or both" of the elements so conjoined, i.e., elements that are conjunctively present in some cases and disjunctively present in other cases.

The phrase "about" as used herein, should be understood to refer to a quantity of a component(s) plus or minus an acceptable amount as deemed appropriate in the art.

As used herein, "or" should be understood to have the same meaning as "and/or" as defined above. For example, when separating a listing of items, "and/or" or "or" shall be interpreted as being inclusive, i.e., the inclusion of at least one, but also including more than one, of a number of items, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

As used herein, the terms "including", "includes", "having", "has", "with", or variants thereof, are intended to be inclusive similar to the term "comprising."

As used herein, the term "component" or "components" refer to an elemental of any of a variety of therapeutic chemicals which may be naturally occurring in certain plants and/or animals and/or derived therefrom, or which may be wholly manufactured molecules which have no naturally occurring counterparts, and include, but are in no manner limited to, biologics and pharmaceutical compositions, and which may be incorporated into the therapeutic formulation in accordance with the present invention.

As used herein, the term "recipe" or "formulation" refers to any combination of two or more components, as defined hereinabove, intended to elicit a desired physiological response from a consumer that consumes the recipe.

The term "therapeutically effective amount" as used with reference to the present therapeutic recipe and/or components thereof as described herein refers to the quantity of the components thereof necessary to render the desired therapeutic result. For example, an effective amount is a level effective to induce a desired result or alleviate the symptoms of a disorder for which the therapeutic recipe is used to treat. Amounts effective for the particular therapeutic goal sought will depend upon a variety of factors including: the disorder being treated and its severity and/or stage of development/progression: the age, body weight, sex, diet, physiology and general health of the subject consuming the formulation; and like factors well known to one of skill in the relevant scientific art.

In one embodiment, a therapeutic recipe in accordance with the present invention comprises a cannabidiol component, known as CBD, and a tetrahydrocannabinol component, known as THC, that is mixable with a variety of alternative components to create a recipe that can be injected, rubbed, or otherwise combined with food. Briefly, as discussed above, Cannabidiol or CBD is a substance extracted from hemp. Although there are a variety of methods on how to extract CBD, one of the most commonly known methods for extracting high-quality CBD includes the use of carbon dioxide ($CO_2$). Through the use of a pressurized chamber, called a closed-loop extractor, $CO_2$ gas is compressed until it becomes a liquid. The liquid is forced over the cannabis material, where it strips away cannabinoids like CBD. The entire solution is brought back to temperature and pressures at which the $CO_2$ reverts to gas and evaporates, leaving behind the CBD extract out of the cannabis plant material. $CO_2$ extraction methods, butane honey oil extraction methods, or ethanol extraction methods can also be used to extract CBD or THC and create, for example, usable waxes or oils.

There is a limited diversity of cannabinoid-containing foods that use CBD or THC. There is even less diversity when it comes to cannabinoid-containing recipes that include meat products. In the present invention, CBD or THC may be used in therapeutic effective amounts together with other components to create recipes that help people who suffer from particular ailments, such as cancer, while consuming fiber-enriched foods, such as meat. Meat, in general, is packed with amino acids essential for health and is rich in protein. Meat is also a good source of iron and bone strengthener supplements, paramount to the health of someone who is receiving treatments for ailments that cause deficiencies in those areas.

In this regard, in one exemplary embodiment, a dry rub recipe that includes CBD or THC is provided. In this first exemplary embodiment, a fifty-two-ounce batch of the dry rub recipe can be subsequently broken down into thirteen, four-ounce portions. Each portion may include a component of brown sugar, garlic powder, onion powder, salt, black pepper, cajun seasoning, peppercorn pepper, and white sugar. The dry rub recipe may also include in a first instance about twenty-five milligrams of CBD per four-ounce portion. In an alternative embodiment, each four-ounce bottle may include about eighty milligrams of THC and CBD. An exemplary recipe may thus comprise the following, about two cups of brown sugar, about one-half cup of garlic powder, about one-half cup of onion powder, about one-quarter cup of salt, about one-third cup of black pepper, about one-third cup of cajun seasoning, about one-quarter cup of peppercorn pepper, about one cup of white sugar, and about twenty-five milligrams of CBD or eighty milligrams of CBD and THC per four-ounce portion. Of course, the potency of the CBD or THC may be adjusted up to one-hundred milligrams of CBD and two-hundred milligrams of THC.

After the components of the dry rub recipe are mixed together and broken down into the desired portion amounts, a portion of the recipe, which in some instances is about four ounces, is rubbed on a piece of meat, such as brisket. If the person desires to add heat to the recipe, i.e., spiciness, dried habanero peppers may be added to the recipe. The number of peppers will depend on the person, however, about eight peppers will give a tasty but not overpowerful heat taste to the plate.

Table 1, shown below, illustrates the first exemplary embodiment of the recipe:

TABLE 1

| Recipe | |
| --- | --- |
| Ingredients | Amount |
| Brown Sugar | 2 Cups |
| Garlic Powder | ½ Cup |
| Onion Powder | ½ Cup |
| Salt | ¼ Cup |
| Black Pepper | 1/3 Cup |
| Cajun Seasoning | 1/3 Cup |
| Peppercorn Pepper | ¼ Cup |
| White Sugar | 1 Cup |
| CBD | 25 Milligrams |

In another exemplary recipe, a second dry rub recipe is generally provided. The second dry rub recipe may include amounts of grain alcohol, distillate or concentrate, white sugar, brown sugar, garlic powder, onion powder, sea salt, black pepper, cajun seasoning, smoked paprika, CBD and THC. The method of preparation of this recipe may include the first step of mixing the distillate or concentrate with the grain alcohol and double boiling the mixture until the mixture turns substantially into the desired color, or in this example golden brown. After the liquid mixture has reached its desired color, the mixture is cooled or allowed to cool until it becomes warm to the touch or about one-hundred to one-hundred five degrees Fahrenheit. The cooled-down mixture is mixed with the white sugar thoroughly until it creates a form of thick gel-like substance. The substance is then spread onto a sheet pan and allowed to dry. After the substance has dried, it is mixed with brown sugar, garlic powder, onion powder, sea salt, black pepper, cajun seasoning, and smoked paprika. Therapeutic amounts of CBD and THC are also added to the mixture.

In this example, the amounts of each component comprise about a hundred and eighty-seven milligrams of grain alcohol, about one thousand milligrams of distillate, about one cup of white sugar, about two cups of brown sugar, about one-half cup garlic powder, about one-half cup of onion powder, about one-quarter cup of sea salt, about one-third cup of black pepper, about one-third cup of cajun seasoning, about one ounce of smoked paprika, and varying therapeutic amounts of THC and CBD that may include between twenty-five milligrams and about one-hundred milligrams of CBD and THC or two-hundred milligrams of THC. In another example, the distillate may be replaced by a concentrate.

Table 2, shown below, illustrates the second exemplary embodiment of the recipe:

TABLE 2

| Recipe | |
| --- | --- |
| Ingredients | Amount |
| Grain Alcohol | 187 Milligrams |
| White Sugar | 1 Cup |
| Brown Sugar | 2 Cups |
| Garlic Power | ½ Cup |
| Onion Powder | ½ Cup |
| Sea Salt | ¼ Cup |
| Black Pepper | 1/3 Cup |
| Cajurn Seasoning | 1/3 Cup |
| Smoked Paprika | 1 Ounce |
| THC | 80 Milligrams |
| CBD | 80 Milligrams |

The recipe can be applied to the person's meat of choice by a number of methods. One method includes mixing the recipe components with a liquid of choice to formulate a liquid based formulation. Through the use of a specialized syringe to impregnate the meat, the liquid formulation can be injected into the meat before it is cooked or smoked. Alternatively, the formulation can be dry rubbed onto the meat before it is cooked or smoked. In yet another alternative form, the recipe, if so desired, can be used on vegetables before they are cooked or steamed.

Turning now to at least a third exemplary embodiment of a therapeutic recipe. A recipe comprising about two cups of brown sugar, about one-half cup of garlic powder, about one-half cup of onion powder, about one-quarter cup of salt, about one-third cup of black pepper, about one-third cup of cajun seasoning, about one-quarter cup of peppercorn pepper, about one cup of white sugar, and about twenty-five milligrams of CBD or eighty milligrams of CBD and THC is mixed together to make a mixture. Of course, one will appreciate that the quantities of each component may vary without departing from the scope of the invention. The mixture is mixed together with a liquid that is desired. In some instances, the liquid may comprise water. In other instances, the liquid may comprise a cooking wine or alcohol-based liquid used in cooking, such as grain alcohol. Accordingly, one will appreciate that the liquid examples provided above are to be considered exemplary and limiting.

Once the mixture is mixed with the liquid of choice, a syringe is used to inject the food item, which in this example is a brisket. The brisket, after being injected with the liquid mixture, may also be coated with a portion of the mixture that was not mixed with the liquid of choice. The rubbing of the dry mixture around the exterior of the brisket seals the openings made by the syringe that injected the liquid-packed flavor into the brisket. The brisket may then rest for a few hours or days. When it comes time to cook the brisket, the wrapped brisket is placed inside of a meat smoker or cooking device of choice to cook as necessary.

The recipe can also be used on alternative savory foods like ground beef to make tasty hamburgers or meatloaf, loaded nachos with meat, fish such as salmon, catfish, trout or the like, and vegetables. Accordingly, one will appreciate that the foregoing examples should be considered exemplary and not limiting in any way. The effects of CBD and THC in each recipe provide a euphoric feeling that will vary depending on the strand used in each recipe. Awakening the appetite of someone suffering and does not have the desire to eat. The recipe will also help those who suffer from anxiety and pain caused by arthritis or other ailments by providing a calm, relaxing feeling after consuming the meat of their choice cooked with the recipe.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A method of cooking savory foods with cannabinoids, comprising the steps of:
   providing a cannabinoid cooking mixture having a therapeutic amount of cannabidiol (CBD) or tetrahydrocannabinol (THC);
   mixing sugar with alcohol to create a mixture;
   allowing the mixture to dry to form a paste;
   mixing the paste with the cannabinoid cooking mixture; and
   applying the cannabinoid cooking mixture to a food item-, where the food item is a meat.

2. The method of claim 1, wherein the cannabinoid cooking mixture comprises an amount of brown sugar, an amount of garlic powder, an amount of salt, an amount of black pepper, an amount of cajun seasoning, an amount of peppercorn pepper, an amount of white sugar, and a therapeutic amount of the CBD or the THC.

3. The method of claim 1, wherein a portion of the paste and the cannabinoid cooking mixture is further mixed with a liquid to form an injectable cannabinoid cooking solution, and wherein the injectable cannabinoid cooking solution is injected into the food item.

4. The method of claim 1, wherein the cannabinoid cooking mixture comprises an amount of about two cups of brown sugar, an amount of about one-half cup of garlic powder, an amount of one-half cup of onion powder, an amount of one-quarter cup of salt, an amount of one-third cup of black pepper, an amount of one-third cup of cajun seasoning, an amount of one-quarter cup of peppercorn pepper, an amount of one cup of white sugar, and a therapeutic amount of twenty-five milligrams of the CBD or a therapeutic amount of eighty milligrams of the CBD and the THC.

5. The method of claim 1, wherein the cannabinoid cooking mixture comprises an amount of grain alcohol, an amount of distillate, an amount of white sugar, an amount of brown sugar, an amount of garlic powder, an amount of onion powder, an amount of sea salt, an amount of black pepper, an amount of cajun seasoning, an amount of smoked paprika, and a therapeutic amount of the CBD or the THC.

6. The method of claim 1, wherein the cannabinoid cooking mixture includes habanero peppers.

7. The method of claim 1, wherein the cannabinoid cooking mixture comprises an amount of one hundred and eighty-seven milligrams of grain alcohol, an amount of one thousand milligrams of distillate, an amount of one cup of white sugar, an amount of two cups of brown sugar, an amount of one-half cup garlic powder, an amount of one-half cup of onion powder, an amount of one-quarter cup of sea salt, an amount of one-third cup of black pepper, an amount of one third cup of cajun seasoning, an amount of about one ounce of smoked paprika, and a therapeutic amount of the THC and the CBD.

8. The method of claim 1, wherein the therapeutic amount of the THC and the CBD is an amount between about twenty-five milligrams and one-hundred milligrams of the CBD.

9. The method of claim 7, wherein the therapeutic amount of the THC is two-hundred milligrams.

10. The method of claim 7, wherein the therapeutic amount of the CBD is two-hundred milligrams.

11. A method of cooking savory foods with cannabinoids, comprising the steps of:
   providing a dry cannabinoid cooking mixture having a therapeutic amount of cannabidiol (CBD) or tetrahydrocannabinol (THC);
   mixing at least one type of sugar with alcohol to form a sugar-infused alcohol-based solution;
   allowing the sugar-infused alcohol-based solution to dry;
   mixing the dry sugar-infused alcohol-based solution with the cannabinoid cooking mixture to form an alcohol-based cannabinoid cooking mixture; and
   adding the alcohol-based cannabinoid cooking mixture to a meat item.

12. The method of claim 11, wherein the cannabinoid cooking mixture comprises an amount of garlic powder, an amount of salt, an amount of black pepper, an amount of cajun seasoning, an amount of peppercorn pepper, and a therapeutic amount of the CBD or the THC.

13. The method of claim 11, the cannabinoid cooking mixture comprises an amount of grain alcohol, an amount of distillate, an amount of garlic powder, an amount of onion powder, an amount of sea salt, an amount of black pepper, an amount of cajun seasoning, an amount of smoked paprika, and a therapeutic amount of the CBD or the THC.

14. A method of cooking savory foods with cannabinoids, comprising the steps of:
   providing a dry cannabinoid cooking mixture having a therapeutic amount of cannabidiol (CBD) or tetrahydrocannabinol (THC);
   mixing at least one type of sugar with alcohol to form a sugar-infused alcohol-based solution;
   double boiling the sugar-infused alcohol-based solution to create an alcohol-based, cannabinoid, cooking solution until the alcohol-based cannabinoid cooking solution reaches a desired color;

cooling the alcohol-based, cannabinoid, cooking solution to form a gel-like substance;

spreading the gel-like substance onto a flat sheet pan and allowing the gel-like substance to dry and to create a dried gel-like substance;

mixing the dried gel-like substance with the dry cannabinoid cooking mixture to form a dry rub mixture; and rubbing the dry rub mixture to a meat item.

15. The method of claim 14, wherein the desired color is golden brown.

16. The method of claim 14, the dry cannabinoid cooking mixture comprises an amount of white sugar, an amount of brown sugar, an amount of garlic powder, an amount of onion powder, an amount of sea salt, an amount of black pepper, an amount of cajun seasoning, an amount of smoked paprika, and a therapeutic amount of the CBD or the THC.

17. The method of claim 14, wherein the dry cannabinoid cooking mixture comprises an amount of brown sugar, an amount of garlic powder, an amount of salt, an amount of black pepper, an amount of cajun seasoning, an amount of peppercorn pepper, an amount of white sugar, and a therapeutic amount of the CBD or the THC.

18. The method of claim 11 further including steps of:

adding vinegar or apple juice to the alcohol-based cannabinoid cooking mixture to form a solution; and disposing the solution into a syringe and utilizing the syringe to impregnate the meat item with the solution.

19. The method of claim 1, further including step of smoking the meat.

20. The method of claim 11, further including step of smoking the meat item.

* * * * *